March 18, 1969 J. KACZOROWSKI, JR 3,434,042
LINEAR CONDUCTANCE SWITCH
Filed March 15, 1967
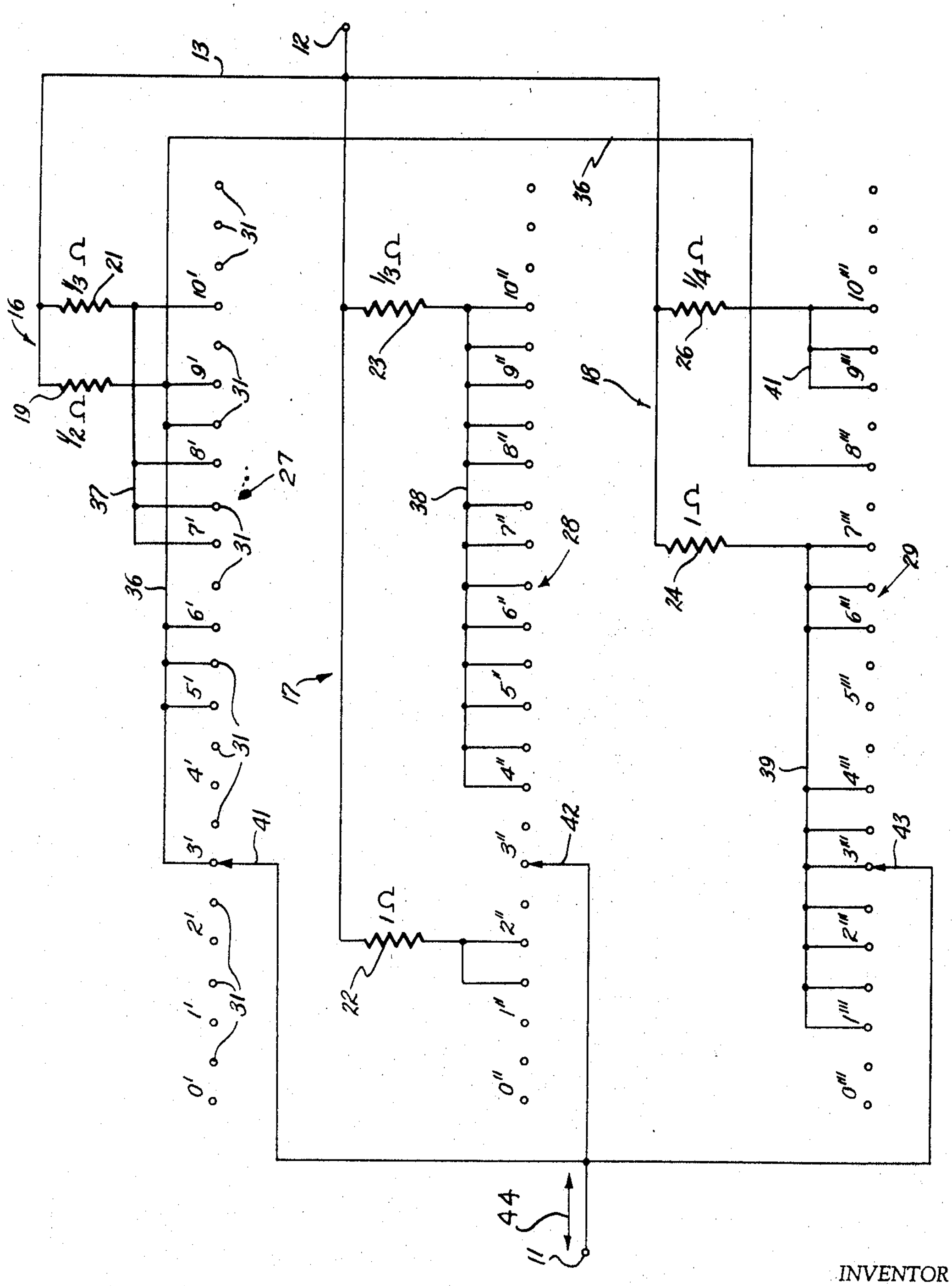
INVENTOR
JOHN KACZOROWSKI, JR.
BY Arnold, Roylance, Kruger & Durkee
ATTORNEYS United States Patent Office 3,434,042
Patented Mar. 18, 1969

3,434,042

LINEAR CONDUCTANCE SWITCH

John Kaczorowski, Jr., Bayberry Point, Mass., assignor to Weston Instruments, Inc., Newark, N.J., a corporation of Delaware Filed Mar. 15, 1967, Ser. No. 623,430
U.S. Cl. 323—74 9 Claims
Int. Cl. H02p 13/16

ABSTRACT OF THE DISCLOSURE

Provides linear conductance switching by unit steps from zero to *n* mhos. A plurality of resistance elements are divided into three groups, the second group having at least one resistance element corresponding to a resistance element in the first group and at least one resistance element corresponding to a resistance element in the third group. For each conductance setting, certain of the resistance elements are connected in parallel circuit relationship via a plurality of wiper elements to provide the desired conductance.

This invention relates to a linear conductance switch, and more particularly to a high precision linear switch which is relatively simple in construction.

Conductance switches can be used in electrical and electronic circuits to assist in controlling or adjusting the operation thereof. For example, such a switch can be connected to insert various values of conductance in series with a load and a variable current source the current magnitude of which is to be kept constant for a particular setting, so that a constant voltage is developed across the inserted conductance for a particular setting of the current source and the conductance switch, whereby the current source can be adjusted if the voltage deviates from the constant value.

Where the inserted conductance must be precise, highly linear and accurate, the conductance switch should meet certain requirements. It should be linearly variable in unit steps of one mho from zero mhos to some convenient number, such as ten mhos. To insure long life for the contacts of the conductance switch, its wiper arm or arms should carry and switch as little current as possible between successive steps. The contact resistance of the switch contacts must not unduly affect the voltage developed across the switch for any particular setting. In this regard, any conductance error occurring as a result of contact resistance should be as constant as possible over the entire range, without resorting to trimming or adjusting of the resistance elements. In addition, the contact switch should be relatively simple in construction, in that it should use as few resistance elements as possible in as simple an arrangement as possible while employing commercially available switch structures.

Prior to the linear conductance switch disclosed in copending application Ser. No. 620,935 filed Mar. 6, 1967, in the names of John Kaczorowski, Jr. and John Nordahl, all of the above requirements were not found in a single prior-art conductance switch. For example, where a prior-art conductance switch was relatively simple in construction, there was a wide range of conductance error over the entire range and/or the contacts carried and sitched relatively high currents. And, where a prior-art conductance switch had a relatively low and constant conductance error over the entire range, the structure of the switch was relatively complicated. While the conductance switch of the above-mentioned Kaczorowski et al. application has all of the above-mentioned requirements for a high precision linear conductance switch, there is a continuing need for improvements in such conductance switches. One area of improvement relates to providing simple arrangements of resistance elements which can be adapted to commercially available switch structures, thereby reducing the cost of such high precision linear conductance switches.

Accordingly, it is an object of this invention to provide a linear conductance switch. A related object is to provide such a conductance switch which is relatively simple in construction and which advantageously employs commercially available switch structures.

Another object is to provide a conductance switch of the type described, which is linearly variable in unit steps of conductance from zero mhos to some convenient number of mhos, such as ten mhos.

Another object is to provide a conductance switch of the type described, which is relatively simple in construction and uses a minimum number of resistance elements which can be arranged in combination with commercially available switch structures. A related object is to provide such a conductance switch which employs more than one resistance element of a given value, thereby taking advantage of quantity purchases to reduce the cost of the switch.

Another object is to provide a conductance switch of the type described in which the contact resistance does not adversely affect the conductance between the terminals of the switch at any particualr setting. A related object is to provide such a conductance switch in which the conductance error is relatively low and is within a relatively narrow range.

Broadly considered, a high precision linear conductance switch according to this invention includes a plurality of resistance elements each having one of its leads electrically connected to a first terminal. The resistance elements are arranged into three groups, the second group having at least one resistance element corresponding to a resistance element in the first group and at least one resistance element corresponding to a resistance element in the second group. The other lead of each resistance element is electrically connected to at least one of a plurality of fixed electrical contacts. A plurality of movable wiper elements are electrically connected to a second terminal, so that, for a particular setting of the conductance switch, certain of the resistance elements are connected in parallel across the first and second terminals via certain ones of the wiper elements and certain ones of the contacts to produce a desired conductance value across the terminals.

In order that the manner in which the foregoing and other objects are attained in accordance with the invention can be understood in detail, a particularly advantageous embodiment thereof will be described with reference to the accompanying drawing, which forms a part of this specification, and wherein:

The single figure is a schematic diagram of a linear conductance switch according to the invention.

A conductance switch, according to the invention, includes a first terminal 11 and a second terminal 12 to which is connected an electrical conductor 13. One lead of each of a plurality of resistance elements is connected to conductor 13, the resistance elements being divided into groups 16, 17 and 18. Group 16 includes two resistance elements 19 and 21 having resistance values respectively of ½ ohm and ⅓ ohm; group 17 includes two resistance elements 22 and 23 having resistance values respectively of 1 ohm and ⅓ ohm; and group 18 includes two resistance elements 24 and 26 having resistance values respectively of 1 ohm and ¼ ohm.

A first set of fixed electrical contacts 27 is associated with resistance element group 16 and includes switch contacts 0′–10′, the distance between adjacent switch contacts being equal. Contact set 27 also includes a shorting contact 31 disposed between adjacent switch contacts, with additional shorting contacts being disposed to the right (as seen in the figure) of switch contact 10′. A second set of fixed electrical contacts 28 is associated with resistance element group 17 and a third set of fixed electrical contacts 29 is associated with resistance element group 18, contact sets 28 and 29 respectively including switch contacts 0″–10″ and 0‴–10‴ and shorting contacts 31 arranged identically to the switch contacts and shorting contacts of contact set 27.

As mentioned above, one lead of each resistance element is connected to conductor 13. The other lead of resistance element 19 is directly connected to switch contact 9′, and via a conductor 36 is connected to switch contacts 5′, 3′, 6′, 9′ and 8‴. The other lead of resistance element 21 is directly connected to conductor 10′ and via a conductor 37 to switch contacts 7′ and 8′.

The other lead of resistance element 22 is directly connected to switch contact 2″, the other lead of resistance element 23 being directly connected to switch contact 10″ and via a conductor 38 to switch contacts 4″–9″. The other lead of resistance element 24 is directly connected to switch contact 7‴, and via a lead 39 to switch contacts 1‴–4″ and 6‴. The other lead of resistance element 26 is directly connected to switch contact 10‴ and via a conductor 40 to switch contact 9‴.

A plurality of wiper elements 41, 42 and 43 are electrically connected to terminal 11 and are mechanically coupled together to be movable as a unit as indicated by arrow 44, wiper elements 41–43 being respectively associated with contact sets 27–29. When the wiper elements engage particular switch contacts, certain resistance elements are connected in parallel circuit relationship between terminals 11 and 12 and have an effective conductance value corresponding to the numerical indication of the switch contacts so engaged by the wiper elements. For example, with the wiper elements positioned as shown in the figure, wiper elements 41, 42 and 43 respectively engage switch contacts 3′, 3″ and 3‴. With the wiper elements so positioned, resistance elements 19 and 24 are connected in parallel between terminals 11 and 12, and present an effective conductance of 3.0 mhos and an effective resistance of 0.333 ohms.

Because skilled persons in the electrical and electronic arts are accustomed to operating rotary type devices (as opposed to sliding devices), the conductance switch of this invention can conventionally be embodied in a commercially available rotary-type switch structure, such as a twenty-four position three-pole switch structure in which each pole has a single wiper arm. Each pole of such a switch structure has 30° switching indexing between switch contacts and has 15° shorting indexing between adjacent switch contacts and shorting contacts.

When the conductance switch of this invention employs a commercially available switch structure of the type described above, some of the shorting contacts 31 of each contact set 27–29 are connected to the various conductors 36–40 and some of the shorting contacts 31 are open circuited. It has been determined by empirical analysis that the arrangement of shorting contacts connected to the various conductors, as shown in the embodiment of the invention illustrated in the figure, results in an extremely low transient voltage level throughout the entire range of the conductance switch. The shorting contacts 31 which are to be connected to the various conductors 36–40, or it may be that no shorting contacts are to be so connected, depends upon the level of transient voltages which can be tolerated in a given application for the linear conductance switch of this invention. As noted above, the shorting contacts to be so connected can be determined empirically.

Assuming that each contact of contact sets 27–29 has a resistance of one milliohm, then the error in conductance between terminals 11 and 12 varies in a very narrow range from 0.10% (for the one mho setting) to 0.34% (for the ten mho setting). The following chart is a compilation of (1) the mhos (G) at a particular setting, (2) the effective resistance (R) at the particular setting, (3) the resistance elements connected in parallel at a particular setting, and (4) the percent error in actual conductance due to the contact resistance of the contacts:

| G between terminals, mhos | R between terminals, ohms | Resistors in parallel comprising G (or R) | G error due to contact resistance, percent |
|---|---|---|---|
| 0 | $\infty$ | ---------- | ---------- |
| 1 | 1 | $R_{24}$ | 0.10 |
| 2 | ½ | $R_{22}//R_{24}$ | 0.10 |
| 3 | ⅓ | $R_{19}//R_{24}$ | 0.17 |
| 4 | ¼ | $R_{23}//R_{24}$ | 0.25 |
| 5 | ⅕ | $R_{19}//R_{23}$ | 0.25 |
| 6 | ⅙ | $R_{19}//R_{23}//R_{24}$ | 0.23 |
| 7 | ⅐ | $R_{21}//R_{23}//R_{24}$ | 0.27 |
| 8 | ⅛ | $R_{19}//R_{21}//R_{23}$ | 0.28 |
| 9 | ⅑ | $R_{19}//R_{23}//R_{26}$ | 0.32 |
| 10 | ⅒ | $R_{21}//R_{23}//R_{26}$ | 0.34 |

In calculating the percent error, one milliohm is added to the resistance value of each resistance element connected in parallel for a particular setting of the conductance switch, and then the effective conductance is calculated for the particular parallel combination of resistance elements which comprise the conductance at that setting. The actual value of conductance is subtracted from the ideal value, and then the difference is calculated as a percentage of the ideal value. From the above chart, it will be seen that the conductance error is very low and has a very narrow range for the various settings of the conductance switch.

As an illustration of one use of conductance switch according to the invention, where all of the above-mentioned requirements of a high precision conductance switch are needed, terminals 11 and 12 of the conductance switch can be connected in series with a variable current source and a high precision ammeter which is to be calibrated. Assume that the ammeter is to be calibrated for ampere and that in response to a particular current generated by the current source, one volt is to be maintained across terminals 11 and 12, a voltmeter being connected across the terminals to sense this voltage.

Since conductance (G) is the reciprocal of resistance (R), the current (I) is related to the voltage (E) across the conductance switch in the following manner:

$$I=EG$$

It is convenient to have the dial of the conductance switch marked with indicia of unit steps of mhos from 0 mhos to 10 mhos, the indicia corresponding to the switch contacts of contact sets 27–29. Thus, if the ammeter under test is to be calibrated for one ampere, the dial of the conductance switch is set to the one mho position. Substituting values into the above equation:

$$1 \text{ ampere} = 1 \text{ volt} \times 1 \text{ mho}$$

If the voltmeter connected across terminals 11 and 12 does not read exactly one volt, the variable current source can be adjusted until the voltmeter reads exactly one volt, thereby indicating that the current source is producing exactly one ampere of current. The ammeter can then be calibrated to read one ampere.

From the foregoing it will be appreciated that a physical embodiment of the conductance switch of this invention is relatively simple in construction in that only a total of six resistance elements are used and only four different values of resistance (two of the resistance elements are repeated) are needed when the conductance switch has ten settings of conductance. It will be appreciated that by repeating some of the resistance elements, economies are realized by purchasing those resistance elements in quantities and the assembly of the conductance switch is simplified.

It will also be appreciated that the conductance switch of this invention has all of the requirements that a linear high precision conductance switch must have in order not to adversely affect the circuit that it is employed in, but has none of the disadvantages associated with prior-art conductance switches. More particularly, the conductance switch is linearly variable in unit steps of one mhos from zero mhos to ten mhos, and each pole of the switch structure is efficiently used. It has been determined that for the conductance switch of this invention relatively low currents are switched and carried by any one of the contacts, yet the conductance switch can carry relatively high currents at its terminals, and when the contacts each have a resistance of 1 milliohm, the actual conductance varies from the ideal conductance over a very narrow range. Additionally, this narrow range of variance of actual conductance from ideal conductance is maintained for a substantial amount of cycling of the conductance switch.

It will be appreciated that, in a broad sense, the conductance switch of this invention provides values of conductance between terminals 11 and 12 from zero to *n* mhos in unit steps and uses three groups of resistance elements, wherein the second resistance element group has at least one resistance element corresponding to a resistance element in the first group and a corresponding resistance element in the third group, the third group having an extra resistance element(s) depending on the value of *n*. For the arrangement of resistance elements shown in the figure, *n* equals ten and three resistance element groups are employed wherein each group has two resistance elements. This arrangement is very convenient, since it permits an operator to switch conductance values into and out of a circuit in decade fashion. If there are to be eight unit steps of conductance switching from zero mhos to eight mhos, then *n* equals eight and resistance element 26 is not employed, as will be apparent by referring to the above chart.

It will also be apparent from the chart that if the arrangement is expanded beyond *n* equals ten then the error range widens somewhat. Those skilled in the art having the teaching of this invention before them will be able to devise other arrangements of resistance elements, if the need arises to do so, where *n* equals some other number than eight or ten.

What is claimed is:

1. A conductance switch of the type having a first terminal and a second terminal, for providing preselected values of conductance between the terminals, comprising the combination of: a plurality of resistance elements arranged into three groups, each of said resistance elements having one lead electrically connected to one of the terminals, said second group having at least one resistance element corresponding to a resistance element in said first resistance element group and at least one resistance element corresponding to a resistance element in said second resistance element group; a plurality of fixed electrical switch contacts, the other lead of each of said resistance elements being electrically connected to at least one of said switch contacts; and a plurality of movable wiper elements electrically connected to the other terminal and arranged to engage said switch contacts, so that at a particular conductance setting of said conductance switch certain of said resistance elements are connected in parallel across the first and the second terminals via certain ones of said switch contacts which certain of said wiper elements respectively engage.

2. A conductance switch according to claim 1, wherein said plurality of wiper elements comprises three of said wiper elements and wherein said plurality of switch contacts comprises three sets of switch contacts, each of said wiper elements and each of said switch contact sets respectively being associated with a respective one of said resistance element groups, each of said wiper elements being arranged to engage said switch contacts of its respective switch contact set.

3. A conductance switch according to claim 1, wherein sadi conductance switch provides values of conductance between the first and second terminals from zero to *n* mhos in unit steps.

4. A conductance switch according to claim 3 in which *n* equals 10, and wherein each of said resistance element groups has two resistance elements.

5. A conductance switch according to claim 4, wherein said first resistance element group has two resistance elements of one-half ohm and one-third ohm respectively, said second resistance element group has two resistance elements of one ohm and one-third ohm respectively, and said third resistance element group has two resistance elements of one-ohm and one-fourth ohm.

6. A linear conductance switch, having a first terminal and a second terminal for providing values of conductance from zero to *n* mhos in unit conductance steps, comprising: a plurality of resistance elements each having one lead electrically connected to one of the terminals and arranged into three groups, said second group having at least one resistance element corresponding to a resistance element in said first group and at least one resistance element corresponding to a resistance element in the second group; first, second and third sets of electrical switch contacts associated respectively with said first, second and third groups of resistance elements, the other lead of each of said resistance element being electrically connected to at least one of said switch contacts; a plurality of wiper elements electrically connected to the other terminal and movable as a unit, respective ones of said wiper elements being associated with respective ones of said switch contact sets, said wiper elements respectively adapted to engage predetermined ones of said switch contacts for each conductance setting so that for a particular conductance setting of said conductance switch certain of said resistance elements are connected in parallel between the first and second terminals.

7. A conductance switch according to claim 6, which provides values of conductance between the first and second terminals from zero to *n* mhos in unit steps.

8. A conductance switch according to claim 7, in which *n* equals 10 and wherein each group of resistance elements is made up of two resistance elements.

9. A conductance switch according to claim 8, wherein said first group of resistance elements has two resistance elements of one-half ohm and one-third ohm respectively, said second group has two resistance elements of one-ohm and one-third ohm respectively, and said third group has two resistance elements of one-ohm and one-fourth ohm.

References Cited

UNITED STATES PATENTS

| | | | |
|---|---|---|---|
| 2,786,122 | 3/1957 | Strain | 323—74 X |
| 2,938,156 | 5/1960 | Smith | 323—74 |
| 2,951,200 | 8/1960 | Critchlow | 323—74 |
| 3,252,080 | 5/1966 | Newbold et al. | 323—74 |
| 3,300,748 | 1/1967 | Gabrielian | 338—200 |

JOHN F. COUCH, *Primary Examiner.*

G. GOLDBERG, *Assistant Examiner.*

U.S. Cl. X.R.

323—94; 324—63; 338—201

Disclaimer and Dedication 3,434,042.—*John Kaczorowski, Jr.*, Bayberry Point, Mass. LINEAR CONDUCTANCE SWITCH. Patent dated Mar. 18, 1969. Disclaimer and dedication filed Mar. 17, 1971, by the assignee, *Weston Instruments, Inc.*

Hereby enters this disclaimer to the remaining term of said patent and dedicates said patent to the Public.

[*Official Gazette April 27, 1971.*]